United States Patent
Park et al.

(10) Patent No.: US 10,878,547 B2
(45) Date of Patent: Dec. 29, 2020

(54) ELECTRONIC DEVICE FOR CORRECTING DARK IMAGES IN REAL TIME

(71) Applicant: ELECTRONICS AND TELECOMMUNICATIONS RESEARCH INSTITUTE, Daejeon (KR)

(72) Inventors: Sora Park, Daejeon (KR); Yoon-Ho Song, Daejeon (KR); Jeong Woong Lee, Gongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 50 days.

(21) Appl. No.: 16/359,676

(22) Filed: Mar. 20, 2019

(65) Prior Publication Data

US 2019/0295236 A1 Sep. 26, 2019

(30) Foreign Application Priority Data

Mar. 20, 2018 (KR) .......................... 10-2018-0032291
Mar. 6, 2019 (KR) .......................... 10-2019-0025983

(51) Int. Cl.
*G06T 5/50* (2006.01)
*G06T 5/00* (2006.01)
*G01N 23/04* (2018.01)

(52) U.S. Cl.
CPC ............... *G06T 5/50* (2013.01); *G01N 23/04* (2013.01); *G06T 5/002* (2013.01); *G01N 2223/304* (2013.01); *G01N 2223/401* (2013.01); *G06T 2207/10116* (2013.01)

(58) Field of Classification Search
CPC . G06T 5/50; G06T 5/002; G06T 2207/10116; G01N 23/04; G01N 2223/304; G01N 2223/401
See application file for complete search history.

(56) References Cited

U.S. PATENT DOCUMENTS

| | | |
|---|---|---|
| 5,452,338 A | 9/1995 | Granfors et al. |
| 9,270,990 B2 | 2/2016 | Lee et al. |
| 2010/0245378 A1* | 9/2010 | Matsuura ............... H04N 5/361 345/589 |
| 2016/0367211 A1 | 12/2016 | Hoshino |
| 2017/0347438 A1 | 11/2017 | Kang et al. |

\* cited by examiner

*Primary Examiner* — Courtney D Thomas

(57) ABSTRACT

Provided is an electronic device including an emission circuit configured to emit a first X-ray based on a clock in a second period when the period of the clock is changed from a first period to a second period and a processing circuit configured to output a first image data value based on a second X-ray received corresponding to the first X-ray or update a correction data value used to correct a first image data value, based on a control signal synchronized with the clock based on the first period.

19 Claims, 7 Drawing Sheets

ELECTRONIC DEVICE FOR CORRECTING DARK IMAGES IN REAL TIME

CROSS-REFERENCE TO RELATED APPLICATIONS

This U.S. non-provisional patent application claims priority under 35 U.S.C. § 119 of Korean Patent Application No. 10-2018-0032291, filed on Mar. 20, 2018 and Korean Patent Application No. 10-2019-0025983, filed Mar. 6, 2019, the entire contents of which are hereby incorporated by reference.

BACKGROUND

The present disclosure herein relates to electronic devices, and more particularly to electronic devices for correcting data values related to an image.

Electronic devices using x-rays are used in various industrial fields. As an example, to view the body and/or objects, medical devices and security devices may include x-ray devices. The x-ray device may generate x-rays based on various methods and detect x-rays.

The x-ray device may include various types of x-ray sources. As an example, the x-ray device may include thermionic emission based x-ray sources and field emission based x-ray sources. The x-ray device may include pixels for detecting x-rays. Pixels may output distorted signals due to noise caused from various factors.

The x-ray device may provide a variety of information to a user based on signals including noise. To provide accurate information, there is a demand for techniques for reducing noise generated in an X-ray device.

SUMMARY

The inventive concept is to provide an electronic device configured to perform, in real time, correction for a data value representing an image of an object based on a data value related to a dark image.

An embodiment of the inventive concept provides an electronic device including: an emission circuit configured to emit a first X-ray based on a clock in a second period when the period of the clock is changed from a first period to a second period; and a processing circuit configured to output a first image data value based on a second X-ray received corresponding to the first X-ray or update a correction data value used to correct a first image data value, based on a control signal synchronized with the clock based on the first period.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
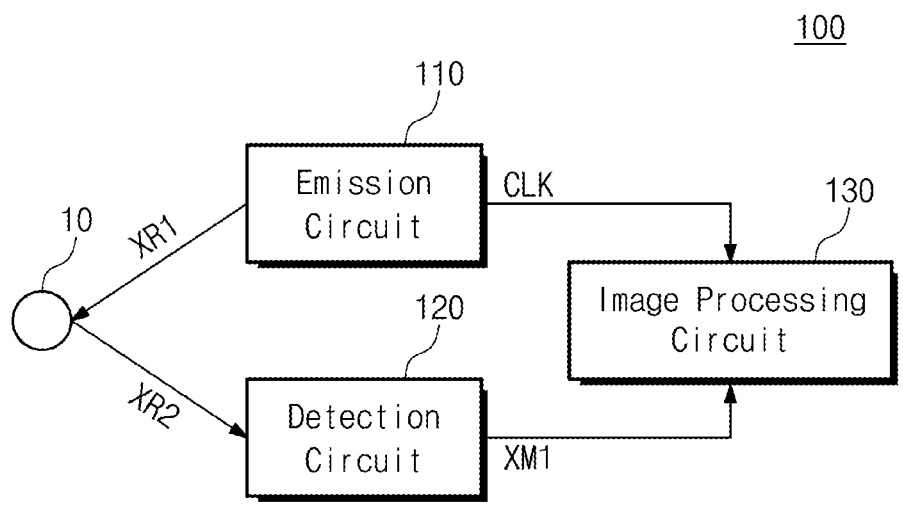
FIG. 1 is a block diagram illustrating an X-ray imaging system according to an embodiment of the inventive concept.

Hereinafter, embodiments of the inventive concept will be described in more detail with reference to the accompanying drawings. In the description below, details such as detailed configurations and structures are simply provided to help overall understanding. Therefore, without departing from the technical idea and scope of the inventive concept, modifications on embodiments described in this specification may be performed by those skilled in the art. Furthermore, descriptions of well-known functions and structures are omitted for clarity and conciseness. The terms used herein are defined in consideration of functions of the inventive concept and are not limited to specific functions. The definition of terms may be determined based on the details in description.

Circuits in drawings or detailed description below may be shown in the drawings or may be connected to another component other than components described in detailed description. Each of connections between circuits or components may be direct or indirect. Each of connections between circuits or components may be a connection by communication or a physical access.

Unless otherwise defined, all terms including technical or scientific meanings used in the specification have meanings understood by those skilled in the art. In general, the terms defined in the dictionary are interpreted to have the same meanings as contextual meanings and unless they are clearly defined in the specification, are not to be interpreted to have ideal or excessively formal meanings.

FIG. 1 is a block diagram illustrating an imaging system according to an embodiment of the inventive concept.

As an example, the image processing device 100 may be an electronic device for processing data of an image obtained based on an X-ray. Referring to FIG. 1, the image processing device 100 may include an emission circuit 110, a detection circuit 120, and an image processing circuit 130.

The emission circuit 110 may generate a clock CLK for digital operation. The emission circuit 110 may output the clock CLK to the image processing circuit 130. The emission circuit 110 may be operated in a digital manner. The emission circuit 110 may generate the X-ray XR1 based on the clock CLK. For example, the emission circuit 110 may include an x-ray source configured to generate an x-ray XR1 based on electrons emitted based on field emission principles.

The emission circuit 110 may emit the X-ray XR1 to the outside of the image processing device 100. The emitted X-ray XR1 may be irradiated on the object 10. As the irradiated X-ray XR1 is interfered by the object 10, X-ray XR2 may be received by the detection circuit 120. Accordingly, the X-ray XR2 may be related to the object 10. For example, the X-ray XR2 may be related to the image of the object 10.

Figure 2:
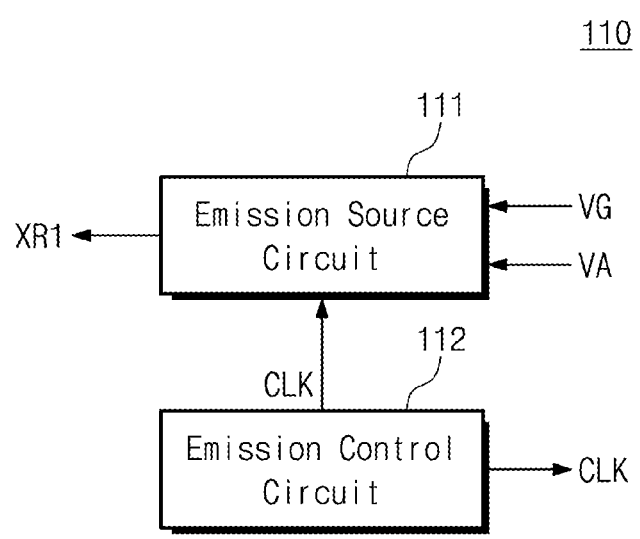
FIG. 2 is a block diagram illustrating an exemplary configuration of the emission circuit of FIG. 1.

To adjust the time length and period that the X-ray XR1 is emitted from the emission circuit 110, the user of the image processing device 100 may set the characteristics of the clock CLK (e.g., the width of the pulses included in the clock CLK and the period of the clock CLK). Referring to FIG. 2, exemplary configurations and operations of the emission circuit 110 will be described in more detail.

The detection circuit 120 may generate the signal XM1 based on the X-ray XR2. For example, the detection circuit 120 may receive the X-ray XR2 by a plurality of pixels. The pixels may generate the signal XM1 by generating charges based on the received X-ray XR2.

Since the signal XM1 is generated based on the X-ray XR2, the signal XM1 may be related to the object 10. For example, the signal XM1 may represent data values (e.g., pixel values) related to an image of the object 10. The detection circuit 120 may output the signal XM1 to the image processing circuit 130.

The signal XM1 may be related to a dark image. For example, the signal XM1 may represent a data value related to a dark image. In the present specification, the dark image means an image generated based on noise or the like generated inside the detection circuit 120, irrespective of the X-ray XR2 received from the outside of the detection circuit 120.

For example, a dark current may be generated inside the detection circuit 120 by an operation voltage or the like for operation of the detection circuit 120. The detection circuit 120 may generate the signal XM1 based on the dark current. Since the dark current is generated regardless of the X-ray XR2 received from the outside of the detection circuit 120, the dark image may be treated as noise to a user who requests information related to the image of the object 10.

The image processing circuit 130 may obtain a data value related to the image of the object 10 based on the clock CLK and the signal XM1. In addition, the image processing circuit 130 may obtain a data value related to the dark image based on the signal XM1. The image processing circuit 130 may process data values related to images of the object 10 and data values related to the dark images based on the signal XM1 and the clock CLK.

The image processing circuit 130 may perform various operations to remove data values caused by the dark image, based on the data values obtained. As an example, the image processing circuit 130 may perform operations to correct data values related to an image of the object 10 based on the data values of the dark image obtained while X-ray XR2 is not received. Referring to FIGS. 4 to 9, exemplary configurations and operations of the image processing circuit 130 will be described in more detail.

The image processing circuit 130 may output signals including the corrected data values to other electronic devices and/or systems. In other electronic devices and/or systems, the corrected data values may be used to provide information related to the image of the object 10. For example, the image processing circuit 130 may output a signal including the corrected data value to the display device. The display device may provide the user with a photo and/or image representing the image of the object 10 based on the data value of the received signal.

FIG. 2 is a block diagram illustrating an exemplary configuration of the emission circuit of FIG. 1.

Referring to FIG. 2, the emission circuit 110 may include an emission source circuit 111 and an emission control circuit 112.

The emission source circuit 111 may receive voltages VG and VA from the outside of the emission circuit 110. For example, the emission source circuit 111 may receive voltages VG and VA from an electronic device, such as a voltage generator. The voltages VG and VA may be used to emit electrons from the inside of the emission source circuit 111.

As described with reference to FIG. 1, the emission source circuit 111 may include an X-ray emission source configured to generate an X-ray based on the field emission principle. For example, voltages VG and VA may have levels for operation of an X-ray emission source. The voltage VG may be applied to the gate terminal, and the voltage VA may be applied to the anode terminal.

The emission circuit 111 may generate the X-ray XR1 based on the clock CLK. For example, the emission source circuit 111 may include various electron sources (e.g., carbon nanotubes, etc.) for providing electrons. The emission source circuit 111 may generate the X-ray XR1 in response to the clock CLK by allowing the electrons to be emitted from various electron sources and to be accelerated to collide with the metal, under the applied voltages VG and VA. The emission source circuit 111 may emit the X-ray XR1 to the outside of the image processing device 100 (e.g., in a direction toward the object 10).

The clock CLK may be related to the time length and period that the X-ray XR1 is emitted. The clock CLK may include pulses having a width set by the user. The width of the clock CLK means a time length in which the clock CLK has a logic high value within one period of the clock CLK. For example, when the width of the clock CLK is long, the duty ratio of the clock CLK may be high.

For example, the emission source circuit 111 may emit X-ray XR1 in response to a logic high value of the clock CLK for a time when the clock CLK has a logic high value. Therefore, the width of the clock CLK may correspond to the length of time that the X-ray XR1 is emitted. Therefore, the period of the clock CLK may correspond to the period that the X-ray XR1 is emitted.

The emission control circuit 112 may generate the clock CLK. As an example, the emission control circuit 112 may include a function generator or the like configured to generate a clock CLK. The emission control circuit 112 may output a clock CLK including pulses generated based on the width and period determined according to the setting of the user. The emission control circuit 112 may provide the clock CLK used for emission of the X-ray XR1 to the emission source circuit 111.

As an example, the user may adjust the width of the pulses included in the clock CLK to adjust the time that the X-ray XR1 is emitted. In addition, the user may adjust the period of the clock CLK to adjust the period in which the X-ray XR1 is emitted. The user may control the function generator included in the emission control circuit 112 to adjust the width of the pulses included in the clock CLK and the period of the clock CLK.

Figure 4:
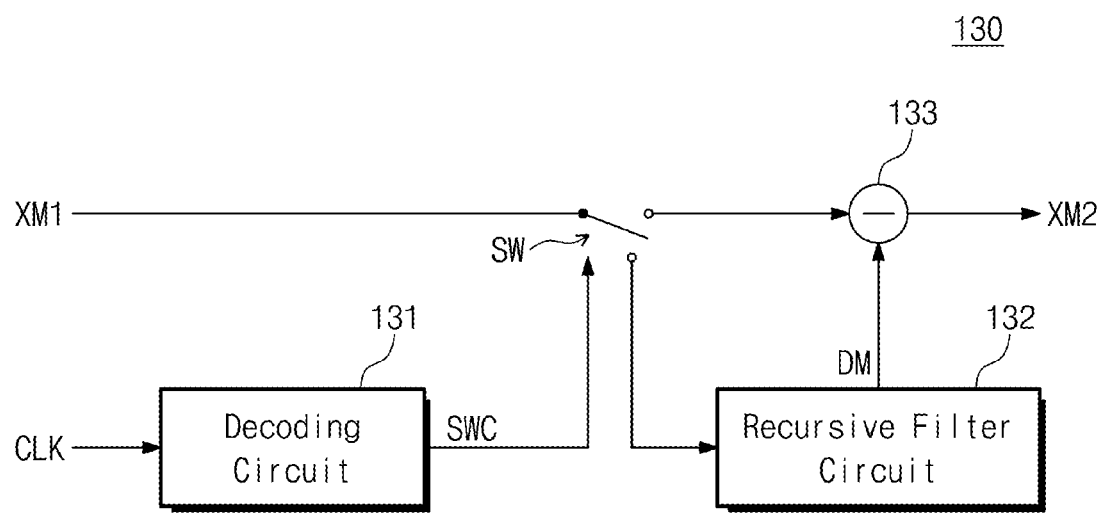
FIG. 4 is a block diagram illustrating an exemplary configuration of the image processing circuit of FIG. 1.
Figure 5:
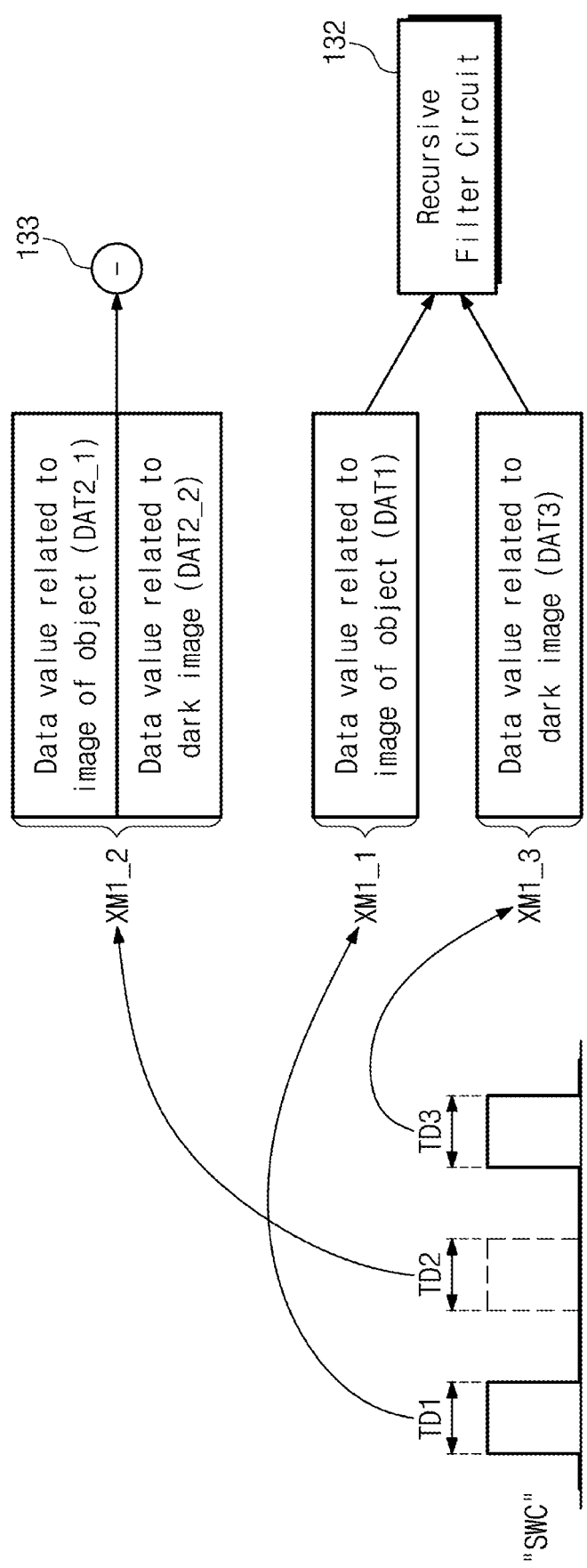
FIG. 5 is a conceptual diagram for explaining exemplary operations of the image processing circuit of FIG. 4.

The emission control circuit 112 may output the clock CLK to the image processing circuit 130 of FIG. 1. The clock CLK may be used by the image processing circuit 130 to generate a data value related to the image of the object 10 and an image value related to the dark image. Referring to FIGS. 4 and 5, exemplary methods for generating data values based on the clock CLK by the emission control circuit 112 will be described and thus, the following description is omitted.

Figure 3:
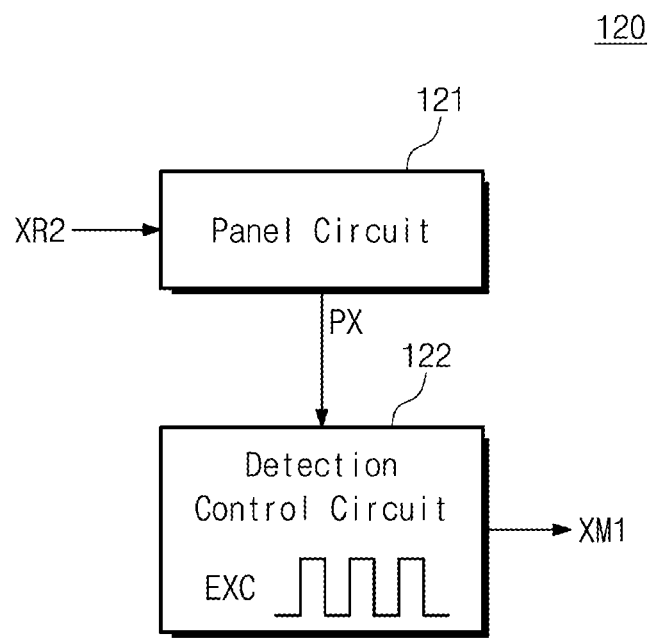
FIG. 3 is a block diagram illustrating an exemplary configuration of the detection circuit of FIG. 1.

FIG. 3 is a block diagram illustrating an exemplary configuration of the detection circuit of FIG. 1.

Referring to FIG. 3, the detection circuit 120 may include a panel circuit 121 and a detection control circuit 122.

The panel circuit 121 may receive the X-ray XR2 interfered by the object 10 after being irradiated to the object 10. For example, the panel circuit 121 may include a pixel array with a plurality of pixels for receiving X-ray XR2. The pixels may include a conversion element (e.g., a photodiode) for generating charges (e.g., an electron hole pair) based on the X-ray XR2 and electronic circuits for generating data values based on the charges.

The panel circuit 121 may generate data values corresponding to the intensity of the X-ray XR2. Thus, the data values may be analog values. Since the data values are generated by the pixels, the data values may correspond to the pixels, respectively. The panel circuit 121 may generate the signal PX to deliver the data values. The panel circuit 121 may output the signal PX to the detection control circuit 122.

The detection control circuit 122 may receive the signal PX from the panel circuit 121. The detection control circuit 122 may obtain data values corresponding respectively to the pixels of the panel circuit 121 based on the signal PX. The detection control circuit 122 may collect data values and generate data in frame units.

As an example, the detection control circuit 122 may generate a signal EXC including pulses to generate data in frame units. The signal EXC may include pulses that are generated periodically. The width of the pulses included in the signal EXC and the period of the pulses may be determined when the image processing device 100 is designed. Referring to FIG. 5, an exemplary signal EXC generated by the detection control circuit 122 will be described in more detail.

As an example, the detection control circuit 122 may generate frame-by-frame data including data values of pixels in response to a pulse of the signal ECX for one period of the signal EXC. The detection control circuit 122 may generate a signal XM1 for delivering the data values in frame units. Since the data values delivered by the signal PX are generated based on the X-ray XR2, they may be related to the image of the object 10. The detection control circuit 122 may output the signal XM1 to the image processing circuit 130.

FIG. 4 is a block diagram illustrating an exemplary configuration of the image processing circuit of FIG. 1.

Referring to FIG. 4, the image processing circuit 130 may include a decoding circuit 131, a recursive filter circuit 132, a calculation circuit 133, and a switch circuit SW.

The decoding circuit 131 may receive the clock CLK from the emission circuit 110. The decoding circuit 131 may generate a signal SWC for controlling the switch circuit SW based on the clock CLK. According to the control by the signal SWC, the switch circuit SW may be selectively connected to one of the recursive filter circuit 132 and the calculation circuit 133.

As described with reference to FIG. 3, the detection circuit 120 may generate a signal XM1 that is independent of the image of the object 10 based on the dark image or generate a signal XM1 that is related to both the dark image and the image of the object 10. The decoding circuit 131 may control the switch circuit SW in order to provide a signal XM1 related to only the dark image to the recursive filter circuit 132 and provide a signal XM1 related to both the dark image and the image of the object 10 to the calculation circuit 133. Referring to FIG. 5, exemplary operations of the decoding circuit 131 and the switch circuit SW will be described in more detail.

The recursive filter circuit 132 may receive a signal XM1 related to the dark image, that is, a signal representing dark data values, through the switch circuit SW. The recursive filter circuit 132 may obtain the data values represented by signal XM1. As the switch circuit SW is controlled by the decoding circuit 131, the recursive filter circuit 132 may receive the signal XM1 at various time sections and sequentially obtain the data values of the signal XM1.

The recursive filter circuit 132 may calculate the average value of the sequentially obtained data values. However, the average value herein means various types of average values calculated on the basis of the weights as well as the arithmetic mean values. The recursive filter circuit 132 may generate a signal DM indicating the calculated average value.

The recursive filter circuit 132 may store the values (e.g., weights) used in the calculation and the calculated average value. The image processing device 100 may include a memory within/outside the image processing device 100, which is configured to store the values used in the calculation and the calculated average value. The memory may include various types of volatile and/or nonvolatile memory devices.

Figure 7:
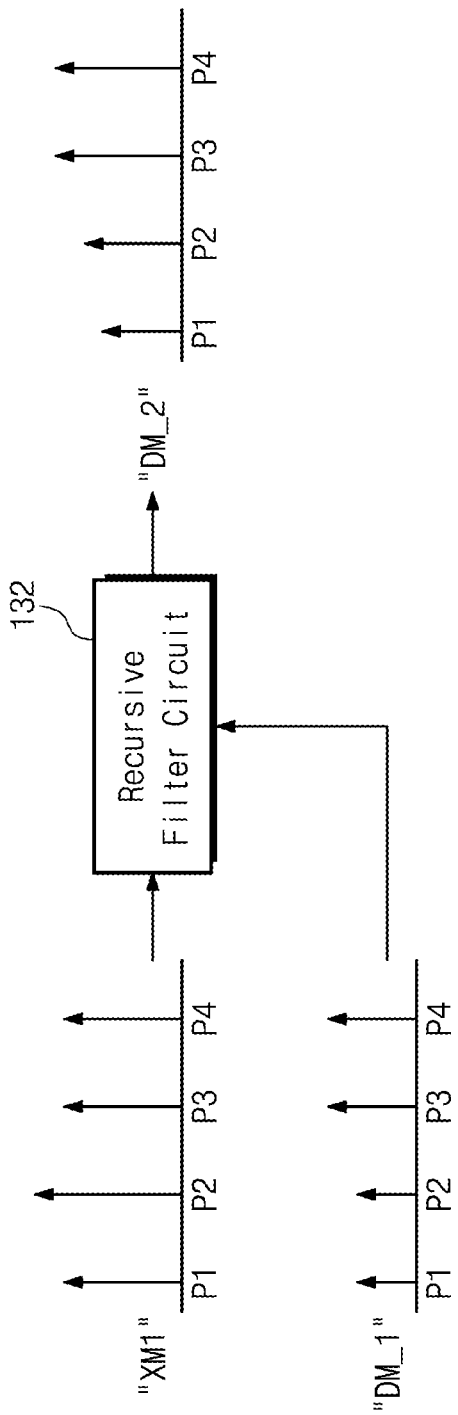
FIG. 7 is a conceptual diagram for explaining exemplary operations of the recursive filter circuit of FIG. 4.

Since the signal DM is generated based on the data values of the signal XM1 related to the dark image, the data value of the signal DM may represent a dark image. For example, the data value of the signal DM may correspond to an average value for the data values of the dark image that are received sequentially. Referring to FIG. 7, exemplary operations of the recursive filter circuit 132 will be described in more detail.

The calculation circuit 133 may receive the signal XM1 through the switch SW1 and receive the signal DM from the recursive filter circuit 132. The calculation circuit 133 may perform various operations based on the data value of the signal XM1 and the data value of the signal DM. As an example, the calculation circuit 133 may perform an operation for correcting the data value of the signal XM1 based on the data value of the signal DM.

The calculation circuit 133 may receive the signal XM1 related to the image of the object 10 and the dark image through the switch circuit SW. Thus, the data value of the signal XM1 received by the calculation circuit 133 may include both the data value for the image of the object 10 and the data value for the dark image. The calculation circuit 133 may perform calculations to remove the data value of the signal DM from the data value of the signal XM1.

Figure 8:
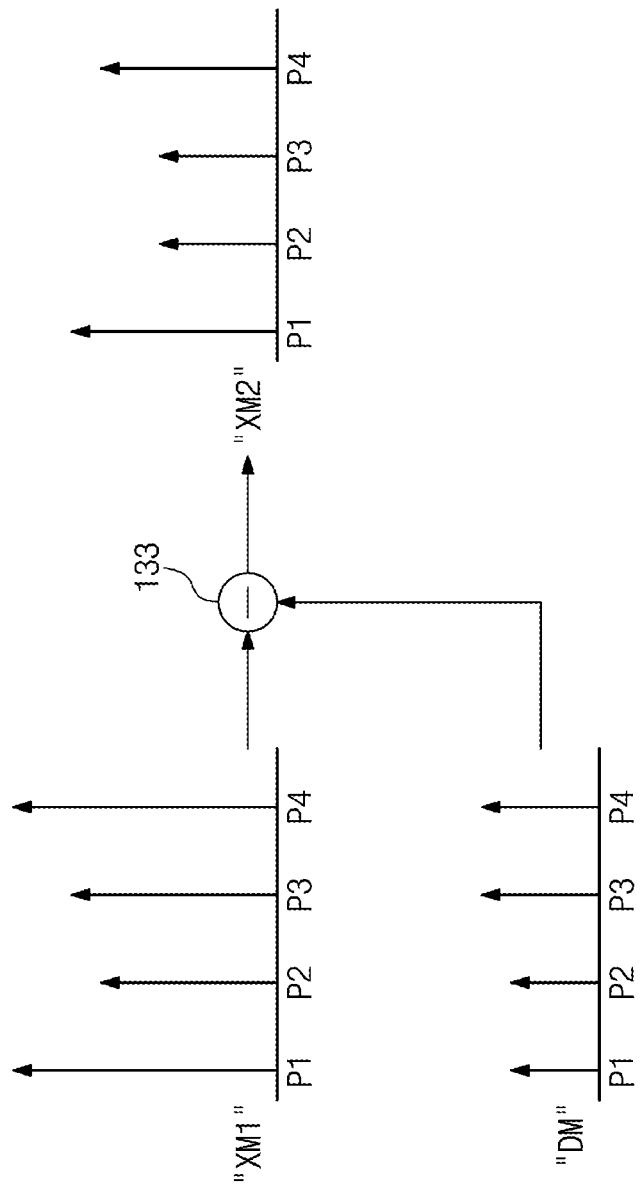
FIG. 8 is a conceptual diagram for explaining exemplary operations of the calculation circuit of FIG. 4.

By the calculation circuit 133, a signal XM2 indicating a data value obtained by subtracting the data value of the signal DM from the data value of the signal XM1 may be generated. Since the data value of the signal DM is related to the dark image, the data value of the dark image included in the signal XM2 may be smaller than the data value of the dark image included in the signal XM1. That is, as the signal XM1 is corrected based on the signal DM by the calculation circuit 133, the signal XM2 may be generated. Referring to FIG. 8, exemplary operations of the calculation circuit 133 will be described in more detail.

The image processing circuit 130 and its components may include hardware circuits (e.g., analog circuits and/or logic circuits) configured to perform the operations described in this disclosure. In some cases, the image processing circuit 130 may be implemented as an application specific integrated circuit (ASIC), a field programmable gate array (FPGA), or the like. Alternatively, the image processing circuit 130 and its components may be implemented based on instructions of the program code, and a processor inside or outside the imaging system 100 may execute instructions to provide operations of the image processing circuit 130 and its components.

FIG. 5 is a conceptual diagram for explaining exemplary operations of the image processing circuit of FIG. 4.

Figure 6:
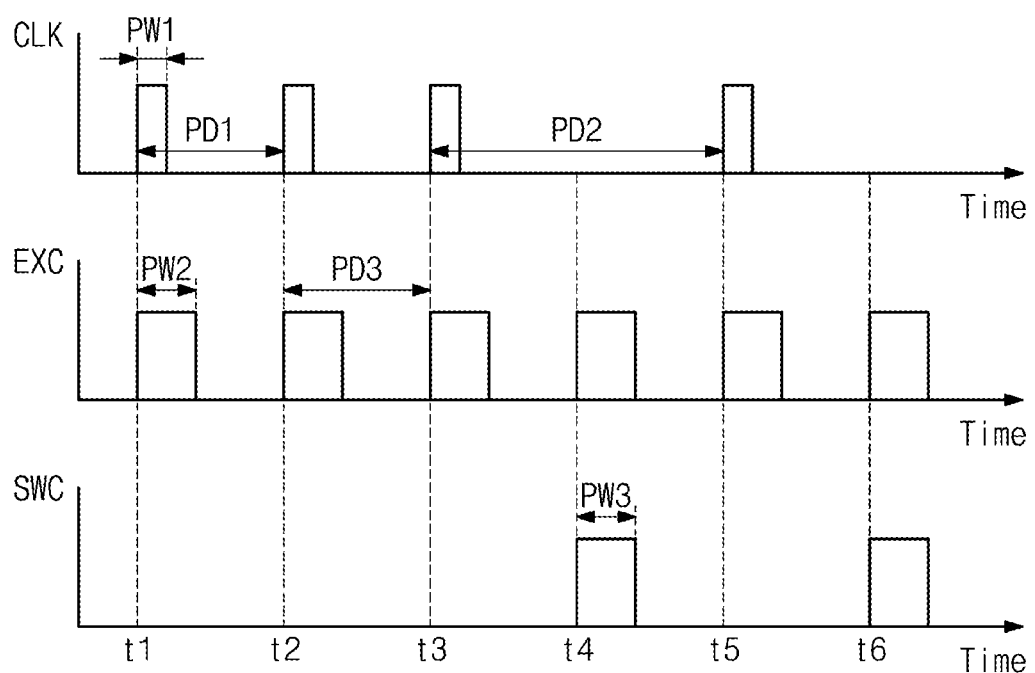
FIG. 6 is a graph showing signals generated by the imaging system of FIG. 1.

As described with reference to FIG. 4, the decoding circuit 131 may generate a signal SWC for controlling the switch circuit SW based on the clock CLK. As an example, the decoding circuit 131 may generate a signal SWC synchronized with the clock CLK. The switch circuit SW may operate based on the signal SWC. Referring to FIG. 6, an exemplary method for generating a signal SWC will be described in more detail.

In the time sections TD1 and TD3, the switch circuit SW may be connected to the recursive filter circuit 132 in response to the logical high value of the signal SWC. In the time sections TD1 and TD3, the signal XM1 may be received by the calculation circuit 133. For convenience of description, the signal XM1 received by the calculation circuit 133 in the time section TD1 will be referred to as a signal XM1_1, and the signal XM1 received by the calculation circuit 133 in the time section TD3 will be referred to as a signal XM1_3.

As described with reference to FIG. 4, the data value of the signal XM1_1 may include the data value DAT1 related to the dark image, and the data value of signal XM1_3 may include the data value DAT3 related to the object. In the time sections TD1 and TD3, the data values DAT1 and DAT3 may be provided to the recursive filter circuit 132 by the signal XM1_2.

In the time section TD2, the switch circuit SW may be connected to the calculation circuit 133 in response to the logical low value of the signal SWC. In the time section TD2, the signal XM1 may be received by the calculation circuit 133. For convenience of description, the signal XM1 received by the calculation circuit 133 in the time section TD2 will be referred to as a signal XM1_2.

As described with reference to FIG. 4, the data value of the signal XM1_2 may include a data value DAT2_1 related to the object and a data value DAT2_2 related to the dark image. In the time sections TD2, the data values DAT2_1 and DAT2_2 may be provided to the calculation circuit 133 by the signals XM1_1 and XM1_3.

As described with reference to FIG. 4, the recursive filter circuit 132 may calculate the average value of the sequentially received data values DAT1 and DAT3 in the time sections TD1 and TD3. Referring to FIG. 7, exemplary operations of the recursive filter circuit 132 will be described in more detail.

FIG. 6 is a graph showing signals generated by the imaging system of FIG. 1. In the example of FIG. 6, the x-axes represent time, and the y-axes represent the logic values of the clock CLK and the signals EXC and SWC, respectively.

As described with reference to FIG. 2, the decoding circuit 110 may generate a signal SWC for controlling the switch circuit SW based on the clock CLK. In the example of FIG. 6, the pulses of the clock CLK may have the adjusted width PW1. The period of the clock CLK may be adjusted from PD1 to PD2. Therefore, the period of the clock CLK before the time point t3 is PD1, and the period of the clock CLK after the time point t3 may be PD2. For example, PD1 may be a period of a clock CLK set by the user when the operation of the image processing device 100 is started.

As described with reference to FIG. 3, the detection control circuit 122 may generate the signal EXC to generate the signal XM1 based on the signal PX. The detection control circuit 122 may generate pulses of the signal EXC having the width set by the designer in a period set by the designer.

In the example of FIG. 6, the signal EXC may include pulses with a width of PW2 as a period of PD3. The detection control circuit 122 may collect the data values of the signal PX in frame units in response to the pulses of the signal EXC, and output the signal XM1 based on the collected data values.

The decoding circuit 131 may generate a signal SWC synchronized with the clock CLK. As an example, the decoding circuit 131 may use the clock CLK as a triggering signal to generate the signal SWC. Accordingly, the decoding circuit 131 may determine the logic value in response to the clock CLK every period PD1 of the clock CLK, and generate the signal SWC having the determined logic value.

As an example, the decoding circuit 131 may determine a logic value for each of the coming time points t1 to t6 for each period PD1 of the clock signal CLK, and generate a signal SWC having the determined logic value. Thus, the decoding circuit 131 generates a signal SWC (not including pulses) of a logic low value at time points t1, t2, t3, and t5, and generate a signal SWC (including a pulse of width PW3) having a logic high value at time points t4 and t6.

The detection circuit 120 obtains a data value related to the image of the object 10 and a data value independent of the image of the object 10 (i.e., a data value related to the dark image) based on the signal XM1. Whether the signal XM1 is related to the image of the object 10 may correspond to whether the X-ray XR2 is received by the detection circuit 120.

Since the X-ray XR2 is received based on the X-ray XR1, whether the X-ray XR2 is received by the detection circuit 120 may correspond to whether the X-ray XR1 is emitted by the emission circuit 110. Since the emission circuit 110 emits the X-ray XR1 based on the pulses of the clock CLK, the clock CLK may be related to whether the X-ray XR2 is received by the detection circuit 120.

As an example, at time points t1, t2, t3, and t5, the emission circuit 110 may emit the X-ray XR1 in response to pulses of a clock CLK. Thus, the detection circuit 120 may generate a signal XM1 that represents a data value (e.g., data value DAT2_1 in FIG. 5) for an image of the object 10 based on the X-ray XR2 corresponding to the X-ray XR1. At time points t1, t2, t3, and t5, in order to deliver the data value for the image of the object 10 to the calculation circuit 133, the decoding circuit 131 may generate a signal SWC that does not include a pulse (i.e., a logic low value) in response to a logical high value of the clock.

As an example, at time points t4 and t6, the detection circuit 120 may generate a data value (e.g., data values DAT1 and DAT3 in FIG. 5) for the dark image. At time points t4 and t6, in order to deliver the data values for the dark image to the recursive filter circuit 132, the decoding circuit 131 may generate a signal SWC including a pulse (i.e., a logical high value) in response to a logical low value of the clock.

The width PW3 of the pulses generated by the signal SWC may be determined when the image processing device 100 is designed. In order to secure a margin for the data value included in the signal XM1 to be delivered to the recursive filter circuit 132, PW3 may be determined in consideration of the width PW2 of the pulses included in the signal EXC. As an example, PW3 may be determined to be substantially equal to PW2.

As described with reference to FIG. 5, the decoding circuit 131 may output the signal SWC to the switch circuit SW to control the switch circuit SW. The switch circuit SW may perform the operations described with reference to FIG. 5 based on the logic value of the signal SWC.

Referring to FIG. 6, operations are described, in which when the clock CLK includes a pulse during the period PD1 before the change, a signal SWC of a logical low value (not including pulses) is generated and when the clock CLK does not include a pulse during the period PD1, a signal SWC having a logic high value (including a pulse of the width PW3) is generated. However, it will be understood that the embodiment of the inventive concept may be variously changed and modified to determine whether the X-ray XR1 is emitted based on the period PD1 of the clock CLK and to generate the signal SWC based on the determination result.

As an example, the decoding circuit 131 may be configured to generate a signal SWC (including pulses) of a logical high value when the clock CLK includes a pulse during PD1, and generate a signal SWC (not including a pulse) having a logic low value when the clock CLK does not include a pulse during PD1.

Even when the period of the clock CLK changes, the image processing circuit 130 may differently process the signal XM1 (e.g., the signals XM1_1 and XM1_3 in FIG. 5) related to both the image 10 of the object and the dark image and the signal XM1 (e.g., the signal XM1_2 in FIG. 5) related only to the dark image based on the signal SWC.

That is, the image processing circuit 130 may determine whether the signal XM1 is related to the image of the object 10 based on the signal SWC generated in synchronization with the clock CLK, and may update the data values of the signal DM to be used for the correction operation of the calculation circuit 133 based on the signal XM1 not related to the image of the object 10.

For example, as the period of the clock CLK changes from PD1 to PD2, the detection circuit 120 may not obtain data values related to the image of the object 10 at time point t4. At time point t4, the switch circuit SW may provide the signal XM1 to the recursive circuit filter 132 in response to a pulse of the signal SWC. The recursive circuit filter 132 may update the data value of the signal DM based on the signal XM1.

FIG. 7 is a conceptual diagram for explaining exemplary operations of the recursive filter circuit of FIG. 4.

In the example of FIG. 7, the signals XM1, DM_1, and DM_2 may represent data in frame units. For easy understanding, signals XM1, DM_1, and DM_2 indicating data values corresponding to the four pixels P1 to P4 of the panel circuit 121 will be described, but it will be understood that the number of data values represented by the signals XM1, DM_1, and DM_2 may be variously modified depending on the number of pixels included in the panel circuit 121.

In the example of FIG. 7, the data value corresponding to a specific pixel is represented by the length of the arrow. As an example, the data values of the signals XM1, DM_1, and DM_2 generated based on the X-ray XR2 received by the pixel P1 may respectively correspond to the lengths of the arrows displayed corresponding to the pixel P1.

The signal DM_1 may represent calculated values for the data values of the signal XM1, which are received sequentially before the operation of FIG. 7 is performed. As an example, before the operation of FIG. 7 is performed, when the signal XM1 is received n times by the recursive filter circuit 132 (where n is a natural number), the recursive filter circuit 132 may calculate the average values of the data values of the n-times received signals XM1.

The recursive filter circuit 132 may store the calculated average values in memory. Then, the recursive filter circuit 132 may receive the stored average values from the memory. In the example of FIG. 7, the recursive filter circuit 132 may receive a signal DM_1 indicating the stored average values. Accordingly, the data values of the signal DM_1 may correspond to the average values of the data values of the signal XM1, which are received n times, respectively.

After the signal XM1 is received n times by the recursive filter circuit 132, the recursive filter circuit 132 may newly receive the signal XM1 in FIG. 7. The recursive filter circuit 132 may newly calculate the average values based on the data values of the newly received signal XM1 and the data values of the signal DM_1.

The recursive filter circuit 132 may generate the signal DM_1 to store the newly calculated average values in the memory. Therefore, the data values of the signal DM_1 may respectively correspond to the average values of data values for the pixels P1 to P4 indicated by the signal XM1 and data values for the pixels P1 to P4 indicated by the signal DM_1.

The recursive filter circuit 132 may store the data values of the signal DM_2 in a memory. Thereafter, when the switch circuit SW is connected to the recursive filter circuit 132, the recursive filter circuit 132 may output a signal DM indicating the data values stored in the memory to the calculation circuit 133 through the switch circuit SW. That is, the data values to be provided to the calculation circuit 133 by the signal DM may be updated by the operations of FIG. 7.

By the operations described with reference to FIG. 7, the data values of the signal DM may be continuously updated based on the data values of the sequentially received signal XM1. Thus, the image processing circuit 130 may continuously update the data values for the dark images that vary in real time according to the environment inside/outside the image processing device 100. Since the image processing circuit 130 generates the signal XM2 based on the data values of the continuously updated signal DM, the data values of the signal XM2 may accurately represent the image of the object 10.

FIG. 8 is a conceptual diagram for explaining exemplary operations of the calculation circuit of FIG. 4.

In the example of FIG. 8, the signals XM1, DM, and XM2 may represent data in frame units. For easy understanding, signals XM1, DM, and XM2 indicating data values corresponding to the four pixels P1 to P4 of the panel circuit 121 will be described, but it will be understood that the number of data values represented by the signals XM1, DM, and XM2 may be variously modified depending on the number of pixels included in the panel circuit 121.

In the example of FIG. 8, the data value corresponding to a specific pixel is represented by the length of the arrow. As an example, the data values of the signals XM1, DM, and XM2 generated based on the X-ray XR2 received by the pixel P1 may respectively correspond to the lengths of the arrows displayed corresponding to the pixel P1.

As described with reference to FIG. 4, the calculation circuit 133 may perform various calculations for correcting the data value of the signal XM1 based on the data value of the signal DM. As an example, the calculation circuit 133 may perform a subtraction calculation to exclude the dark image data values included in the data values of the signal XM1.

The calculation circuit 133 may generate a signal XM2 that represents the data values obtained by subtracting the data values for the pixels P1 to P4 indicated by the signal DM from the data values for the pixels P1 to P4 indicated by the signal XM1, respectively, as the data values for the pixels P1 to P4.

The data values of the signal XM1 include data values for the image of the object 10 and dark images, and the data values of the signal DM may include data values for the dark image. Thus, the data values for the dark image included in the signal XM2 may be less than the data values for the dark image included in the signal XM1. Since the signal XM2 includes fewer data values for the dark image, the data values of the signal XM2 may accurately represent the image of the object 10.

As described with reference to FIG. 1, the data values of the signal XM2 may be used to provide information related to the image of the object 10. As the data values of the signal XM2 accurately represent the image of the object 10 by the image processing circuit 130, other electronic devices and/or systems that are provided with signal XM2 may provide the user with accurate information related to the image of object 10.

Figure 9:
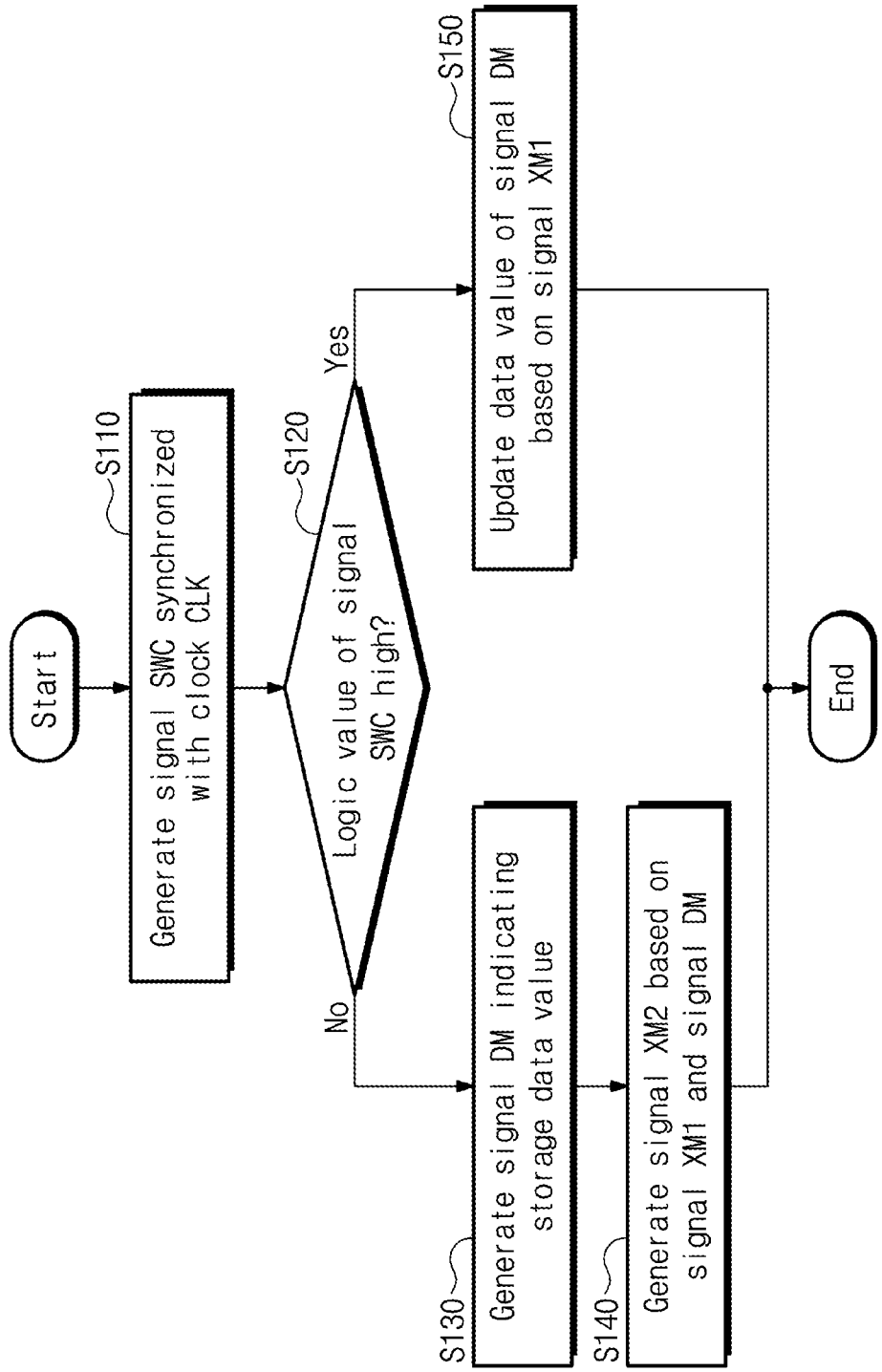
FIG. 9 is a flowchart for explaining exemplary operations of the image processing circuit of FIG. 1.

FIG. 9 is a flowchart for explaining exemplary operations of the image processing circuit of FIG. 1.

In operation S110, the decoding circuit 131 may generate a signal SWC for controlling the switch circuit SW based on the clock CLK. The decoding circuit 131 may generate a signal SWC synchronized with the clock CLK based on a period of the clock CLK. Since the emission circuit 110 emits the X-ray XR1 based on the clock CLK and the detection circuit 120 receives the X-ray XR2 corresponding to the emitted X-ray XR1, the signal SWC may be related to whether the X-ray XR2 is received by the detection circuit 120.

In operation S120, the switch circuit SW may operate according to the logic value of the signal SWC. When the signal SWC has a logic high value, the switch circuit SW may be connected to the recursive filter circuit 132. Thus, the signal XM1 may be provided to the recursive filter circuit 132, and then, operation S130 may be performed. When the signal SWC has a logic low value, the switch circuit SW may be connected to the calculation circuit 133. Thus, the signal XM1 may be provided to the calculation circuit 133, and then, operation S150 may be performed.

In operation S130, the recursive filter circuit 132 may generate a signal DM indicating the data values stored in the memory. The data values may be related to a dark image generated in the detection circuit 120.

In operation S140, the calculation circuit 133 may perform various calculations based on the data values of the signal XM1 and the data values of the signal DM. As an example, the calculation circuit 133 may generate a signal XM2 indicating data values obtained by subtracting the data values of the signal DM from the data values of the signal XM1. Thereafter, the operation of FIG. 9 may be terminated.

In operation S150, the recursive filter circuit 132 may update the data values of the signal DM based on the data values of the signal XM1. The recursive filter circuit 132 may calculate the average values of the stored data values and the data values of the signal XM1 based on the number of times received by the recursive filter circuit 132 or the like. The recursive filter circuit 132 may store the calculated average values in the memory as the data values of the updated signal DM.

According to an embodiment of the inventive concept, data values that accurately represent an image of an object may be calculated.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. An electronic device comprising:
    an emission circuit configured to emit a first X-ray based on a clock signal in a second period, when the period of the clock signal is changed from a first period to the second period; and
    a processing circuit configured to determine whether to output a first image data value when a second X-ray that is a reflection of the first X-ray off an object is received, or to update a correction data value, based on a control signal synchronized with the clock signal based on the first period, the correction data value being used to correct the first image data value,
    wherein the processing circuit is configured to update the correction data value for the dark images that vary in real time.

2. The electronic device of claim 1, wherein the first image data value is related to an intensity of the second X-ray.

3. The electronic device of claim 1, wherein when the control signal has a first logic value, the processing circuit is further configured to update the correction data value based further on a second image data value generated based on the second X-ray.

4. The electronic device of claim 3, wherein when the control signal has a second logic value, the processing circuit is further configured to output the first image data based further on the second image data value and the correction data value.

5. The electronic device of claim 4, wherein the updated correction data value corresponds to an average value calculated based on the correction data value and the second image data value.

6. The electronic device of claim 1, further comprising a detection circuit including a pixel configured to receive the second X-ray.

7. The electronic device of claim 6, wherein the correction data value is related to a noise generated by the detection circuit.

8. The electronic device of claim 1, wherein the first image data value is related to an image of the object.

9. An electronic device comprising:
    an emission circuit configured to emit a first X-ray based on a clock signal having a second period changed from a first period;
    a detection circuit configured to generate a first image data value based on a second X-ray that is a reflection of the first X-ray off of an object, and to generate a second image data value based on a noise; and
    a processing circuit configured to calculate a third image data value based on the first image data value and a first correction data value, or to calculate a second correction data value based on the second image data value and the first correction data value, according to whether the clock signal having the second period comprises a pulse during the first period, the third image data value being related to an image of an object, the first correction data value and the second correction data value being related to the noise,
    wherein the processing circuit is configured to update the correction data value for the dark images that vary in real time.

10. The electronic device of claim 9, wherein the detection circuit is further configured to generate a fourth image data value based on the second X-ray after the first image data is generated, wherein the processing circuit is further configured to calculate a fifth image data value based on the fourth image data value and the second correction data value, according to whether the clock signal comprises the pulse during the first period, the fifth image data value being related to the image of the object.

11. The electronic device of claim 9, wherein the noise is related to a dark image generated by the detection circuit.

12. The electronic device of claim 9, wherein the image processing circuit is further configured to generate a control signal in synchronization with the clock signal to indicate one of a first logic value or a second logic value in each of the first periods.

13. The electronic device of claim 12, wherein the image processing circuit is further configured to calculate the third image data based further on the first logic value of the control signal.

14. The electronic device of claim 13, wherein the image processing circuit is further configured to calculate the second correction data value based further on the second logic value of the control signal.

15. An electronic device comprising:
a detection circuit configured to generate a first image data value based on a received second X-ray that is a reflection of a first X-ray outputted based on a clock signal that changes from a first period to a second period; and a processing circuit configured to:
generate a control signal related to reception of the second X-ray based on the clock signal,
calculate a second image data value related to an image of an object, based on the first image data value and a first correction data value in response to a first logic value of the control signal, and
calculate a second correction data value related to a noise based on the first image data value and the first correction data value in response to a second logic value of the control signal,
wherein the processing circuit is configured to update the correction data value for the dark images that vary in real time.

16. The electronic device of claim 15, wherein the first correction data value is calculated based on a third image data value, generated by the detection circuit based on the noise before the first image data value is generated.

17. The electronic device of claim 15, wherein the second correction data value is an average value calculated based on the first correction data value and the first image data value.

18. The electronic device of claim 15, wherein the control signal has the first logic value in correspondence to the second X-ray received by the detection circuit.

19. The electronic device of claim 15, wherein the control signal has the first logic value in correspondence to the first X-ray outputted based on the clock signal.

* * * * *